(12) United States Patent
Heitplatz

(10) Patent No.: US 6,874,614 B2
(45) Date of Patent: Apr. 5, 2005

(54) METHOD AND APPARATUS FOR ACTIVATING A TIPPING SHELL SORTER, AS WELL AS A TIPPING CONVEYOR ELEMENT

(75) Inventor: Heino Heitplatz, Heitkampsweg (DE)

(73) Assignee: Beumer Maschinenfabrik GmbH & Co. KG, Beckum (DE)

(*) Notice: Subject to any disclaimer, the term of this patent is extended or adjusted under 35 U.S.C. 154(b) by 0 days.

(21) Appl. No.: 10/664,278

(22) Filed: Sep. 17, 2003

(65) Prior Publication Data

US 2004/0069593 A1 Apr. 15, 2004

(30) Foreign Application Priority Data

Sep. 18, 2002 (EP) ............................................ 02020871

(51) Int. Cl.⁷ .............................................. B65G 47/10
(52) U.S. Cl. .................. 198/370.04; 209/900; 209/912
(58) Field of Search ....................... 198/370.04, 370.05; 209/900, 912

(56) References Cited

U.S. PATENT DOCUMENTS

| 4,722,430 A | * | 2/1988 | Canziani | ................ | 198/370.04 |
| 4,726,464 A | * | 2/1988 | Canziani | ................ | 198/370.04 |
| 6,253,901 B1 | | 7/2001 | Hintz et al. | | |
| 6,712,194 B1 | * | 3/2004 | Abildgaard et al. | ... | 198/370.04 |

FOREIGN PATENT DOCUMENTS

| DE | 87 14 976 | 3/1988 |
| DE | 1 231 163 | 8/2002 |
| WO | WO 00/23203 | 4/2000 |
| WO | WO 00/71446 | 11/2000 |

\* cited by examiner

Primary Examiner—Joseph Valenza
(74) Attorney, Agent, or Firm—Collard & Roe, P.C.

(57) ABSTRACT

The invention relates to a method and device for the individual or group activation of tipping conveyor elements of a tipping shell sorter, which are provided with an electric motor tipping drive. The electric motor of the tipping drive, is supplied with electrical energy transmitted in a contact-free manner, and is initially brought up to its rated or idle speed ($n_0$), without a load, before the tipping process is initiated. The tipping device has an electronic control device so that when the electric motor, receives a tipping control signal, as the conveyor or elements approach a receiving station, the motor is initially brought up to its rated speed ($n_0$), without activating the tipping device. The tipping device is then automatically activated by the control device. This causes the tipping conveyor element and its horizontal support surface to be tipped to one side so that one or more piece goods will be delivered to a preselected receiving station, while the conveyor system is moving. A central computer is used to identify the tipping conveyor or elements and the location of the receiving stations so that goods transported on the conveyor will be accurately dispensed to the proper station.

35 Claims, 10 Drawing Sheets

METHOD AND APPARATUS FOR ACTIVATING A TIPPING SHELL SORTER, AS WELL AS A TIPPING CONVEYOR ELEMENT

CROSS REFERENCE TO RELATED APPLICATIONS

Applicant claims priority under 35 U.S.C. §119 of European Application No. 02 020 871.6 filed Sep. 18, 2002.

1. Field of the Invention

The present invention relates to a method and apparatus for an individual or group activation for tipping a surface out of the upright conveying or transport position, as well as tilting it back from the tipped position to the transport position, for the tipping conveyor elements of a tipping shell sorter, which are provided with an electric motor or tipping drive.

The invention furthermore relates to a tipping conveyor element for a tipping shell sorter, for a targeted, generally individual delivery of piece goods parts previously taken up in at least one take-up or receiving station, at one or more targets, or delivery locations. There are a plurality of tipping conveyor elements, units or wagons that are connected with one another in articulated manner, and can be moved along a guide path such as a horizontal rail, that is generally closed in itself. The unit has slanted and/or vertical conveyor segments each having a support means for supporting at least one piece goods part that can be tipped to the side, relative to a non-tippable bottom part of the tipping conveyor element. There is an essentially horizontal support surface which in its upright, normal transport position, can be tipped after receiving a tipping control signal from a generally computer-controlled control device, for delivering piece goods parts being transported. An electric tipping drive is provided on each tipping conveyor element, with an electric motor, particularly designated as a direct current motor. A tipping device is assigned to the electric tipping drive, at the predetermined target location, from an upright transport position, about a tipping axis that runs in the transport direction of the tipping conveyor element, to one or the other side of the conveyor, into a slanted delivery position, in limited manner, particularly for implementing the method of the invention.

2. The Prior Art

In terms of conveyor technology, the prior art sorters are generally link conveyors for sorting piece goods parts, such as packages in post offices, pieces of luggage at airports, consignment goods and mail order house products, and the like.

These sorters are known in the most varied of designs. The fundamental principle is that piece goods parts, which must be handled in an unordered sequence, such as for example, pieces of luggage at airports, must be put in order, or sorted according to certain aspects. The piece goods parts, have generally been coded before being placed into the sorter. They are placed in the sorter in at least one take-up station, and are then transported by the sorter to the predetermined target or delivery location, where they are discharged by the sorter sideways, in a suitable manner.

The piece goods parts to be sorted are usually separated beforehand, when they are placed onto the sorter, and generally placed individually onto a transport location of the sorter. In the case of several take-up stations, they are placed preferably onto the next free take-up location that approaches the take-up station in question, in order to maximize the use of the sorter. Longer piece goods parts may occupy two or more individual transport locations, so that the two or more conveyor units involved, must then be controlled synchronously, because they essentially function as one "extra-long" conveyor unit.

In order to achieve a targeted delivery of the piece goods parts at the intended location, different designs are possible. For example, so-called pushers arranged at the side of the conveyor are known, and are arranged opposite a target location, to the side of the sorter. These push a piece goods part to be delivered at a target location off the sorter, by means of a ram or the like. The ram can be activated essentially crosswise with respect to the transport direction of the sorter. This type of piece goods delivery is unsuitable for various piece goods, such as fragile items, particularly at relatively high sorting speeds, since high pusher accelerations are required because of the corresponding short delivery time that is available. Moreover, these accelerations must act on the piece goods part at a correspondingly greater pushing force when the pusher acts on a piece goods part that is to be delivered, and thus can damage the latter when doing so.

Another known sorter for piece goods delivery uses an ejector that pivots, and which is also stationary, at a target location. This method of emptying or delivery is also suitable only for sorters having a relatively slow transport speed. This sorter has the disadvantage that a piece goods part to be delivered might be rotated about a vertical axis, relative to its transport position, when it runs up against an ejector that has been pivoted in, so that uncontrolled relative movements between the piece goods and the sorter, i.e. the delivery station can occur, particularly for long piece goods parts.

In the two aforementioned sorter types, it is not necessary to structure the sorter as a link conveyor, particularly if the conveyor runs only in a horizontal plane, although this is generally practical also with the aforementioned delivery work methods or similar delivery work methods.

In order to be able to deliver fragile piece goods parts, to this target location, without having to overcome great frictional resistance and the rotation frequently caused by it during the delivery, process sorters have been used. There is a risk of roll-over, close to the target, essentially at the same height level. These sorters have take-up spaces, each consisting of a so-called cross-belt conveyor. These cross-belt conveyors each have a driven endless conveyor belt that is deflected around two rollers or rolls, arranged at a distance from one another, running in the transport direction of the sorter. One of the rollers is driven by an electric motor arranged on the conveyor unit, running with the sorter, so that the carrying run of the cross-belt conveyor moves towards the intended target location. Thus, the cross-belt conveyor of a conveyor unit is attached to a support device, which is connected with the support device of the preceding and subsequent conveyor unit, respectively, at its front and back end segment, forming a link chain. The link chain consists of all of the support devices supported in articulated manner, and guided on its bottom end segment, facing away from the cross-belt conveyor, on two parallel spaced-apart rails, which define the intended transport path.

When a conveyor unit, loaded with piece goods, approaches the intended target location in the case of the a cross-belt sorter, the drive of the cross-belt conveyor receives a turn-on signal when the target location is reached, and is connected with a voltage source, i.e. a current source.

The piece goods part is then transported off the cross-belt conveyor, crosswise to the local longitudinal transport direction of the sorter to the side. This is in the direction of the target location, at an unreduced sorter speed, which is relatively high, and is taken up by a take-up means. The take-up surface is preferably located essentially on the same level as the top of the carrying run of the cross-belt conveyor, but can also be lower.

The electric motors of the cross-belts of a cross-belt sorter receive their electrical drive energy from electrical lines that are connected with a stationary power rail, by the wiper contacts on the conveyor unit. The power rail is connected with an electric voltage source, such as for example, used by municipal transit trains and subways. It is regularly used when a movable "part", provided with an electric drive, must be supplied with electrical energy by a stationary voltage source.

A significant disadvantage of this cross-belt sorter is that its contact line system is subject to significant wear. Here, the current collectors constantly move relative to the power rail during the sorting process, while being pressed against it under significant pressure. Thus, there is a significant amount of friction that occurs, with relatively large heating. These sorters are therefore rather expensive to maintain and repair, and also expensive to install in the first place. In addition, the maintenance and repair work always results in a down time of the sorter, and the entire distribution system. This is extremely inconvenient, for example in the case of sorting systems in the post office or in mail order houses. The system is thus completely unacceptable, for example in the case of luggage sorting systems at airports.

In order to avoid these and other disadvantages, similar sorters have been provided with friction wheels that are put into rotation on the rails when the sorter is in operation. They are engaged with dynamos that generate the electrical energy required for driving the cross-belt conveyors. For these friction-wheel cross-belt conveyor sorters, the significant wear between the current collectors and the power rail is eliminated. However, it has been shown that a significant wear can occur between the friction wheels and the support and guide rails, on the one hand, and the dynamos, on the other hand. This is due to the unavoidable slip, which can result in significant contamination, and also make frequent maintenance and repair work necessary. The friction wear generally has the effect of reducing the friction of the contact between the friction wheels and the rails and the dynamos, respectively. Thus, the electrical energy that can be generated by the dynamos finally varies from one conveyor element to another. In individual cases, the energy is too low to provide a sufficient electrical energy for driving the cross-belt conveyor or a conveyor unit.

Finally, so-called tipping shell sorters designed as link conveyors are also known. Their upper end segment for each conveyor unit, carries the carrying shell or carrying plate. It can be tipped out of its generally horizontal transport position into a slanted tipping position at the target location. This causes the piece goods part in question to slide off to the side at the intended target location. When tipping shell sorters are used, a stationary tipping device is present at every target location. This can be brought into engagement with a tipping element that approaches the delivery station in question, so that the carrying or tipping shell is tipped to the side in the manner described above. This has the effect that after the conveyor unit has passed the target location, its tipping or carrying shell is brought back into the upright transport position, and locked in place in this position, in suitable manner.

For known tipping shell sorters, the piece goods part that has been transported to a predetermined target location, is delivered by means of externally triggered tipping of the tipping shell. If the element of a sorter conveyor unit forming the support surface for the piece goods part(s) is designed in a shell shape, it is still generally referred to as a "tipping shell."

The tipping is externally triggered by means of a device arranged at each target location, which is out of engagement with the sorter as conveyor elements pass, and is brought into engagement with the tipping conveyor element, after a tipping command has been received from a control device, such as by pivoting out a control roller, in timely manner, which engages the tipping device of the tipping conveyor element to cause its tipping shell to tip at the target location. This delivers the piece goods part but has certain advantages, and has significant disadvantages. The significant advantage, particularly for relatively large, or long sorter systems is that not every conveyor element has to be provided with its own tipping device, which can be switched on but instead, only the individual target locations have to be so equipped. A significant disadvantage, however, is that the demands on the tipping devices and also on the other elements connected with them are correspondingly great, particularly in the case of sorters moving at relatively high transport speeds.

It would therefore be highly desirable to be able to control the individual conveyor elements of a tipping shell sorter externally, by means of a suitable electrical control. Thus, without any mechanical intervention and by using an external device, having a fixed location, at the target location, it is also possible to move target locations as desired, without resorting to complicated refitting work.

A tipping shell sorter whose individual conveyor elements each have a drive that can be driven by an electric motor is known from DE 87 14 976 U1. This sorter has unloading stations arranged along its transport path, with a number of unloading openings arranged one above the other, which each lead to separate goods take-up containers. In this known sorter, devices for prepositioning the transport level precisely at the height of the predetermined unloading opening during the transport process are provided. The level for transporting the piece goods parts on the wagon, or conveyor unit, is preferably affixed by way of an articulated construction in the shape of a parallelogram. Thus, devices are provided that act on this articulated construction, in order to bring the transport level to the predetermined height. The devices for acting on the articulated construction can each consist of an electric motor, coupled with a screw spindle, which engages with a traveler, which is attached to the articulated construction.

For the aforementioned special case, electric drives were included to replace the slower acting pneumatic activation of movable partitions inside take-up funnels at target stations, and instead provide a relatively high sorting conveyor speed. In this connection, the individual conveyor units, structured as so-called wagons, run along rails, along a predetermined transport path, and are each driven by a drive motor. The motor is supplied with energy by way of wiper contacts, by a series of electric busbars laid along the transport path. The conveyor units each consist of a cross-belt conveyor that can be driven by a second electric motor. A foldable lever construction that can be driven by a third electric motor, by way of a screw spindle, can lift the cross-belt conveyor to the desired height after receiving a control signal.

In another embodiment disclosed in DE 87 14 976 U1, the individual conveyor places do not consist of cross-belt conveyors, but rather of tipping conveyor elements having a conventional tipping shell with a flat support surface. A roller, guided in a guide is arranged on the side of the foldable lever construction, in order to bring the tipping shells to the desired delivery level. The tipping is described as taking place in known manner and assumed to take place by means of external mechanical intervention, in a conventional manner described above.

SUMMARY OF THE INVENTION

The present invention provides a tipping conveyor element having a tipping movement that can be initiated and carried out by means of an electric motor drive. The required electrical energy is supplied in a contact-free manner without any wiper contacts or power rails or electrical cables between the sorter and the power network. The tipping conveyor elements are nevertheless mechanically locked, and rigidly fixed in their upright transport position, without requiring any additional mechanical locking devices, so that the tipping conveyor shells remain fixed in place even if the power fails. Thus, no accidents can occur due to piece goods parts that fall off to the side, and thus no damage can occur. The sorter has a relatively low construction height and it should be possible to achieve automatic locking or self-locking in the inclined, but not yet fully tipped positions of the tipping shells such as in the case of a power failure.

In the method part of the invention, the electric motor of the electric motor tipping drive of each tipping conveyor element is first brought essentially to its rated no load speed, before the tipping process is initiated. The available electrical output to drive the tipping conveyor element loaded with piece goods is limited to a set maximum value for the contact-free transmission of electrical energy.

Earlier, contact-free energy transmission, which supplies not only the control and measuring devices, but also the electric drives of work and/or transport devices, was not technically possible for devices with a higher power demand, since the required electrical output would be at a level that could not be transmitted in a contact-free manner.

Thus, for example, EP 1 231 163 discloses a piece goods storage device for defined placement into and removal from storage of piece goods units. It has been practiced with great success, in which a storage vehicle that can be driven by an electric motor, can be moved along a conveyor path, and has a height-adjustable, pivotable take-up device for a piece goods load. A device for contact-free transmission and supply of the storage vehicle with the required drive and control energy is provided. It has a conductor that runs along the transport path, and is supplied with high-frequency electrical energy. There is also a pick-up conductor that works together with the former, in a contact-free manner, arranged on the storage vehicle, which inductively picks up the electrical energy emitted by the conductor. The pick-up conductor passes the electrical energy that has been picked up, to a transformer in the storage vehicle, which converts it to an energy form required for the operation of the storage vehicle. For this piece goods storage device, an electrical drive output of more than 6 kW is required.

The power demand peaks that can occur, at the beginning of a tipping process, because of the so-called static and ramp-up motor resistance can exceed the maximum power output, and must be avoided, if possible, for the electrical drive energy that is transmitted in contact-free manner. The use or application of electrical energy transmitted in contact-free manner has been precluded, right from the start, for sorters and other work machines, because of the high energy requirements.

However, in the present application if, the resistance forces that occur during tipping of a tipping conveyor element and must be overcome by the electric drive, i.e. its motor, are quasi split up, and therefore are overcome not simultaneously, in usual manner, but with a time offset, one after the other. In other words, first the static resistance of the electric motor drive is overcome, and the rated speed of the electric motor is reached. Then, once the inertia mass of rotation of the electric motor and the mechanical device(s) arranged immediately following it are in at the rated operating speed, is the tipping process initiated and carried out.

Preferably, the tipping process of a tipping conveyor element is controlled, after the rated speed of the electric motor has been reached, so that the maximum electrical output available to the electric motor transmitted to it in contact-free manner is not exceeded at any time, by the need for power during the entire tipping process. The power available is optimally utilized, in practical manner to achieve as rapid a movement as possible. It is highly practical if the tipping movement is controlled so that the electric motor, after being brought up to its rated idle speed, operates during and after initiation of the tipping process, by means of appropriate acceleration of the tipping shell, at a power level that is essentially equal to the maximum power supply of the electrical energy that can be transmitted in contact-free manner. Once the tipping process has been initiated, a tipping conveyor element to be tipped is preferably permanently accelerated in the direction of the tipping movement to be carried out, essentially as long as necessary, until its final tipping position has been reached.

In order to avoid relatively severe impact stresses, the tipping conveyor element is braked just before it reaches its final tipping position. This takes place in both an electrical manner, but also in suitable mechanical manner.

Furthermore, the tipping conveyor element to be tipped is accelerated in essentially constant manner after the tipping process has been initiated, until it approximately reaches its final tipping position, so that no power peaks occur.

The electric motor of the electric tipping drive is preferably a DC motor, and is supplied with electrical energy in contact-free manner. The tipping device has a control device assigned to it, so that the electric motor of the tipping drive, after having received a tipping control signal, is first brought from a stand-still to its rated no load speed, essentially in an idle or free-running operation, without activating the tipping device. The tipping device is then automatically activated by the control device assigned to it, as soon as the electric motor has at least reached its rated speed.

In a preferred embodiment of the present invention, the control device of the tipping device, has a free-running device which, after the tipping conveyor device has received a tipping signal, and when the electric motor is brought up to its rated speed, causes the support means supporting a piece goods part, to initially remain in its upright position, ahead of the predetermined target location. The tipping and/or control device are structured designed in one embodiment, so that the support means is automatically tipped out of its upright transport position into its slanted tipping position, when the electric motor has reached its rated speed. The tipping conveyor element is designed so that it can be tipped to the either side of the sorter.

The support surface at its top has an articulated bearing that is mounted to pivot, in limited manner on the tipping axis. A locking means is provided, wherein the support means can be releasably locked in its transport position. The tipping and/or control device, has a lever arrangement that can pivot, in limited manner, about a second pivot axis, parallel to the tipping axis. It has a guide means that is guided in the support means provided below the support surface. The electric motor is connected with the lever arrangement by way of a gear mechanism. The motor speed can then be finally be reduced on the support means, in suitable manner. The guide for the guide means of the lever arrangement initially runs in arc shape about the second pivot axis, in a first guide segment. Thus, rotation of the power take-off axis of the electric motor, and therefore of the lever arrangement, during the circular movement of the guide means does not result in any tipping movement of the support means, or of the piece goods part(s) supported thereon. A second guide segment that immediately follows the first guide segment no longer runs in arc shape relative to the second pivot axis, but rather in such a manner that if the electric motor, which has been brought up to its rated speed, is rotated further, a force is exerted on the support means by the lever arrangement, which initiates the tipping of the support means about the tipping axis.

The lever arrangement has two levers that are arranged at a reciprocal lengthwise distance from one another, which can be structured essentially in a disk shape. The levers can be provided with gear teeth on their face, which interact with a gear wheel. The gear wheels form the gear mechanism of the electric motor tipping drive.

The gear mechanism has self-locking worn gear mechanism arranged ahead of the radial gear drive, which is driven by the electric motor of the electric motor tipping drive. Thus, automatic self-locking can be achieved in each intermediate tipping position of a tipping conveyor element, to prevent uncontrolled tipping of the tipping conveyor element, and unintentional ejection of a piece good part in the case of a power failure. This prevents accidents and damage, or even destruction of the piece goods parts in such a case.

In a preferred embodiment of the invention, the guide means is formed by guide rollers that are arranged on an end segment of a lever. Each lever is provided with a guide roller at its two end segments. In this way, the dimensions of the support means can be kept particularly small.

Furthermore, the support means, which at its top is screwed together with a tipping shell that forms the support surface, consists of two essentially spaced apart disk-shaped segments. They are arranged on the tipping axis so that their longitudinal center axis runs vertical when the tipping conveyor element is in the upright transport position, and thereby at a right angle to the longitudinal center axis of the levers. The disk-shaped segments of the support means are preferably structured essentially with a mirror symmetry. This is highly practical, particularly for tipping conveyor elements that are supposed to be used in a sorter for tipping to both sides.

It is furthermore highly practical if the second pivot axis is arranged not only above the tipping axis, but also perpendicular above it. It should also be pointed out that the levers are preferably structured essentially with mirror symmetry, relative to a center axis that runs through its pivot axis. They are preferably arranged so that their longitudinal axis, which runs through its two guide means arranged at the ends, run essentially horizontal in the transport direction of the tipping conveyor element.

The guides for the guide rollers are formed of recesses in the segments that form the support means. The guide surfaces of the segments, which run parallel to the surfaces of the segments, form running tracks for the guide rollers.

Finally, a maximum tipping angle of the tipping shell of approximately 35° is generally sufficient to deliver any piece goods gently, reliably and rapidly, from the tipping shell to a target location. It is highly practical and therefore preferable if the lever pivot angle is approximately 90°, for a maximum tipping angle of the support means of approximately 35°. The lever pivot angle can, however, also be greater than 90°, and can then produce a tipping angle of 40° or more.

Furthermore, it is practical to design the system so that the free-running operation (support means tipping angle $\beta=0°$) ends at a lever pivot angle $\alpha$ of approximately 10°. The tipping process of the support means and thereby the tipping shell that is rigidly connected with the latter, from 0° at first (in the normal transport position) to a maximum of approximately 35°, is carried out in the range of a lever pivot angle between 10° and 90°.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings wherein similar reference characters denote similar elements throughout the figures.

DETAILED DESCRIPTION OF PREFERRED EMBODIMENTS

Figure 1:
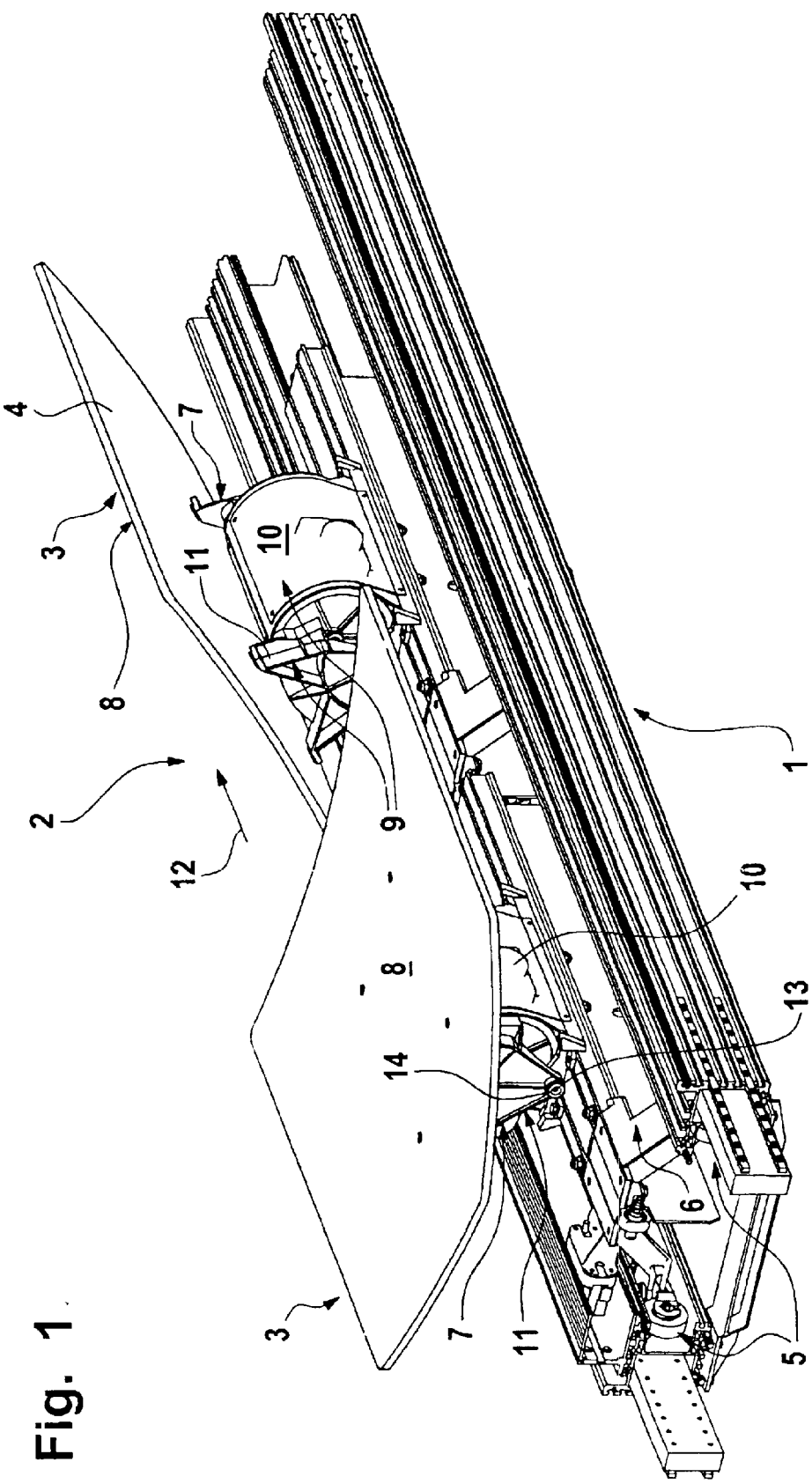
FIG. 1 is a perspective view of a short segment of the conveyor system of a tipping shell sorter with two adjacent tipping conveyor elements, shown in this upright, normal transport position, and final tipping position.

Turning now in detail to the drawings, FIG. 1 shows a short segment of a tipping shell sorter 1, for targeted, individual delivery of piece goods parts, (not shown) such as packages, pieces of luggage, or the like, which have previously been taken up at a take-up location, (not shown) at one of a plurality of target locations 2. Two tipping elements 3 are shown, of which the front tipping conveyor element 3 is in its upright, normal transport position, and the rear-tipping element 3', on the right, is in its maximum tipping position. Its tipping shell 4 is shown inclined at an angle of 35 degrees relative to the horizontal, and to one side.

Tipping shell sorter 1 actually has a plurality of tipping conveyor elements 3, 3', etc. which can be moved along a horizontal rail guide 5, closed in itself, so as to be driven, in known manner, by means of an electrically drivable linear motor (not shown). These elements are pivotably connected to one another in articulated manner.

Tipping conveyor elements 3 have a support means 7, which can be tipped to both sides relative to its non-tippable bottom part 6. A support surface 8, that is essentially horizontal in its upright normal transport position, is disposed on support means 7, and can be tipped from its upright transport position. Surface 8 pivots about a tipping axis 13 that runs along the transport direction 12 of tipping conveyor element 3, 3'. The surface can tip to one side or the other of the transport path, in limited manner, into a slanted delivery position. The tipping movement is responsive to a tipping control signal received from a control device, (34) of sorter 1, so as to deliver the piece goods part to a predetermined target location 2. An electric tipping drive 9, is provided with an electric motor 10 designed as a direct current motor, and drives a tipping device 11, coupled the electric tipping drive 9, connected to support surface 8, as will be explained further in greater detail. Control device 34 is connected to a pick-up element 33 which is mounted adjacent to a stationary conductor 31 mounted along rail guide 5 so that a high frequency electrical contact free electrical coupling can take place between the pick-up element 33 and the conductor.

In this connection, electric motor 10 is supplied with electrical energy by a suitable device that functionally, or "electrically" corresponds essentially to the device described in EP 1 231 163, in a contact free manner, intended for a piece goods storage device, and need not be described in greater detail. Since the available electrical output is limited to a predetermined maximum in the case of contact-free energy transmission, the tipping movement should not be initiated until directly adjacent to the predetermined target location 2. Tipping is supposed to take place, if possible, relatively rapidly. Tipping device 11 has a mechanical control device, described in greater detail below, which causes electric motor 10 of tipping drive 9, after receiving a tipping control signal, to first be brought to its rated speed $n_0$, from a stand-still, in an essentially load-free, idle or free-running operation, and to be then activated accordingly. Tipping device 11 can only be automatically activated by control device 34 as soon as electric motor 10 of electric tipping drive 9 has reached its rated speed $n_0$.

In this connection, the tipping movement of a tipping conveyor element 3 is controlled, after the rated speed $n_0$ of electric motor (10) has been reached. Thus, the maximum electrical output from the electrical energy to be transmitted to it in contact-free manner, which is available to electric motor 10, is not exceeded by the need for power at any time during the entire tipping process or, during the tilting-back process. Thus, the tipping movement is controlled so as to provide as rapid a tipping movement as possible. Electric motor 10, which has been brought to its rated idle speed $n_0$, demands an output, during and after initiation of the tipping process, by means of corresponding acceleration of tipping shell 4 and the piece goods part supported on it. This is essentially equal to, but not greater than, the maximum power supply of the electrical output transmitted to the electric motor in a contact-free manner. In this connection, tipping conveyor element 3 as it is tipped, is essentially permanently accelerated, after initiation of the tipping process, until it has reached its final tipping position. It is electrically braked just before it reaches its final tipping position. Moreover, tipping element 3 to be tipped is essentially accelerated constantly, until it has reached its final tipping position, after initiation of the tipping process, as will be explained in greater detail with reference to FIG. 5.

Control device 34 assigned to tipping device 11, receives a tipping signal from pick up element 33 to activate tipping conveyor element, while electric motor 10 is brought up to its rated speed $n_0$, just before predetermined target location 2 is reached, so as to cause the piece goods part supported on surface 8 to be delivered to a target location 2. The part is held by support means 7, on its tipping shell 4, in its upright, non-tipped transport position, while the electric motor 10 is brought up to speed. The tipping device and the control device are designed so that support means 7 is automatically tipped from its upright transport position to its slanted tipping position once electric motor 10 has reached its rated speed $n_0$. Support means 7 having support surface 8 at its top, is provided with an articulated bearing 14 (see also FIGS. 2 and 3), which is mounted to pivot on tipping axis 13 in limited manner.

Furthermore, a locking means described in detail below is provided, wherein support means 7 can be releasably mechanically locked in its transport position.

In FIG. 3, the tipping and control device, i.e. their free-running device, which is explained in greater detail below, have a second pivot axis 15 arranged parallel to and perpendicular above tipping axis 13. A lever arrangement 16, to be described in greater detail below, with a guide means 17 can be pivoted in limited manner, in a guide 18 of support means 7, provided below the support surface 8. Electric motor 10 is connected with lever arrangement 16 by way of a gear mechanism, as shown in FIG. 4.

In FIGS. 2 and 3, guide 18 has a first guide segment 18', which is designed in arc shape about the second pivot axis 15. Thus, a rotation of the power take-off axis of electric motor 10, and therefore of the lever arrangement 16, does not at first result in any tipping movement of support means 7 and the piece goods part, about the second pivot axis or about tipping axis 13, during the circular movement of guide means 17 on the arc-shaped first guide segment 18' about a second pivot axis 15.

Figure 3A:
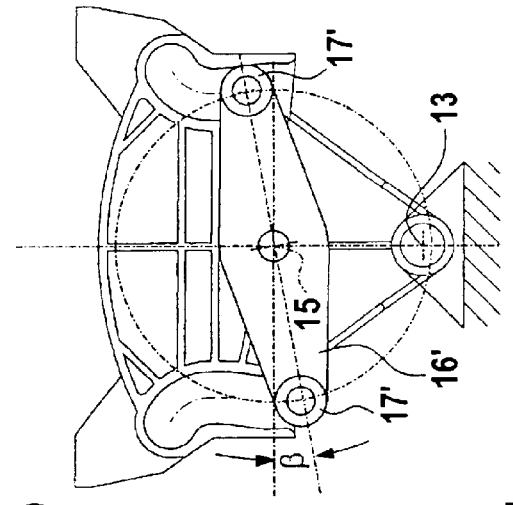
FIGS. 3a, 3b, 3c and 3d show representations according to FIG. 2, showing the lever of the lever arrangement assigned to the disk-shaped segment of the support means.

In FIG. 3a, the first guide segment 18' is immediately followed by a second guide segment 18" (on both sides), which no longer runs in arc shape relative to second pivot axis 15. When electric motor 10, which has been brought to its rated speed $n_0$, continues to rotate further, a force, or a torque is exerted on support means 7, to cause it to tip about tipping axis 13.

Figure 4:
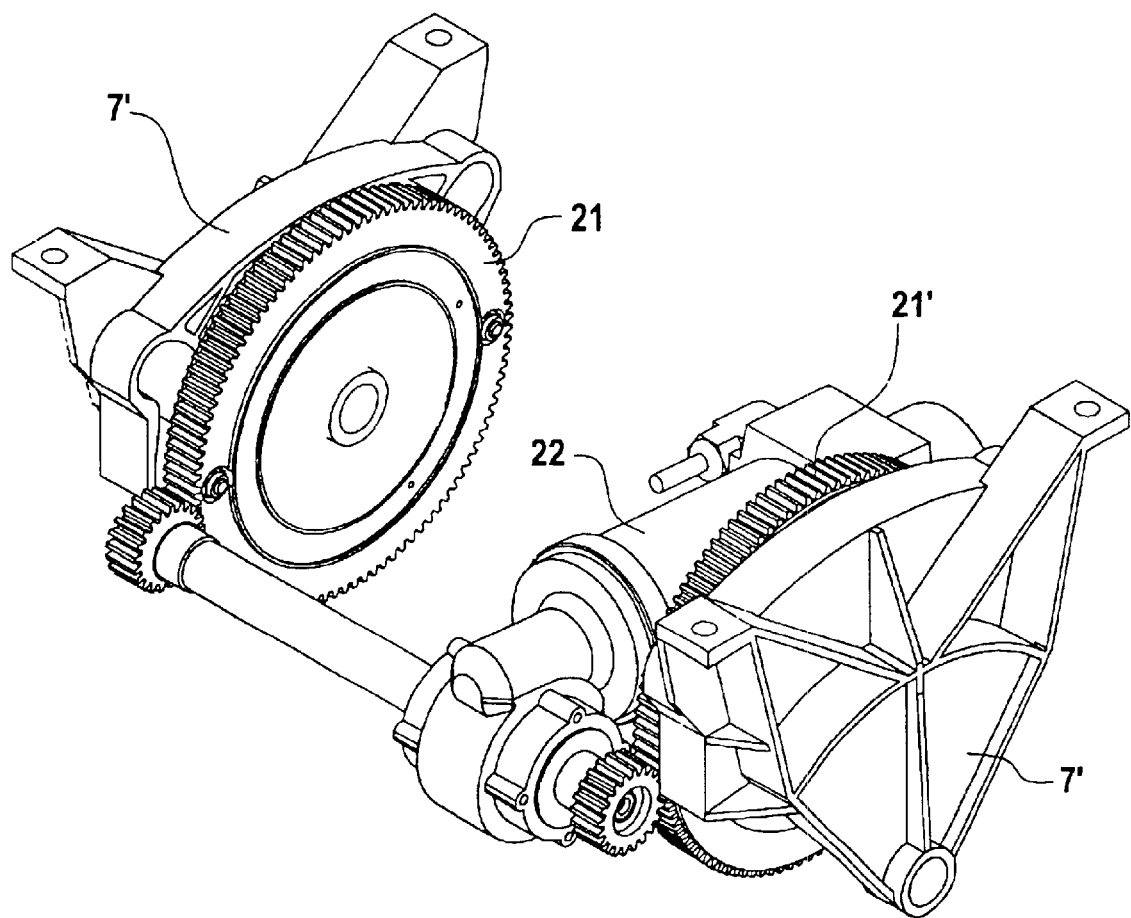
FIG. 4 is a perspective view of the gear mechanism of the electric motor drive of a tipping conveyor element.

FIG. 4 shows the relative arrangement of the gear mechanism 19, consisting of the radial gear wheels 21, 21' and worm wheel gear mechanism 22, with regard to the two disk-shaped segments 7', 7' of support means 7.

Lever arrangement 16 has two levers 16' and 16" arranged at a reciprocal, longitudinal spaced-apart distance from one another, which can be each structured to be essentially disk-shaped, and have gear teeth at their surfaces. The gear teeth can also interact with or be a part of radial gear wheels 21 and 21', respectively, whereby radial gear wheels 21 and 21' with guide means 17 pivotably mounted thereon form part of gear mechanism 19 of electric tipping drive 9. Radial gear mechanism 21 and 21' is driven by a self-locking worm wheel gear mechanism 22, driven by electric motor 10, which causes shaft 36 containing spur gears 27 at its ends, to rotate gear wheels 21, 21', and thus causes guide means 17 to rotate in guide segments 18, so as to rotate both support means 7.

Moreover, in FIGS. 2 and 3, guide means 17 consists of four guide rollers 17', are arranged at an end segment of lever 16' or 16", and specifically at the two end segments of levers 16', 16". In FIG. 2, for the sake of simplicity, only two guide rollers 17', 17' of one lever 16' are shown, and the lever itself is left out, while in FIG. 3, it is evident where the lever is arranged, in connection with a disk-shaped segment of the support means 7.

Support means 7 that is screwed together, at its top surface to tipping shell 4, forms support surface 8 at its top, and consists of two essentially disk-shaped segments 7', 7', spaced apart horizontally from one another, on a tipping axis 13, so that their longitudinal center axis 23 runs vertically in the transport position of tipping conveyor element 3, as shown in FIG. 3a, and thereby at a right angle to longitudinal center axis 24 of the two levers 16' and 16", respectively.

It is particularly evident from FIGS. 2 and 3 that disk-shaped segments 7' of support means 7 are designed with mirror symmetry, whereby their longitudinal center axis 23 lies in the plane of symmetry.

The two levers 16' and 16" of lever arrangement 16 also run through a center axis, that runs through the second pivot axis 15, with mirror symmetry, in each instance. They are arranged so that their longitudinal axis, which runs horizontally through their two guide rollers 17', 17', runs in the transport direction 12 of tipping conveyor element 3.

Guides 18 of support means 7 formed by disk-like segments 7', 7', on which guide rollers 17', are shown as recesses formed in segments 7'. The guide surfaces 25 of the recesses run essentially parallel to the faces of the segments, to form running tracks for guide rollers 17'.

Figure 2A:
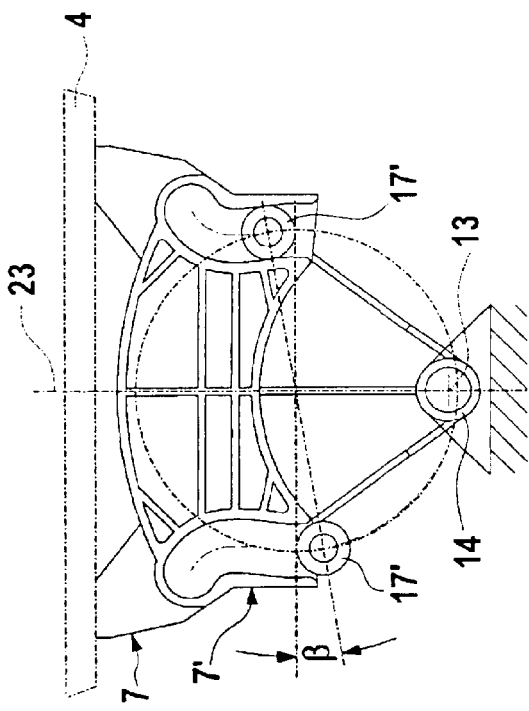
FIGS. 2a, 2b, 2c & 2d show various positions of the support means consisting of two disk-shaped segments arranged at a distance from one another, and guide rollers that interact with the former.
Figure 2B:
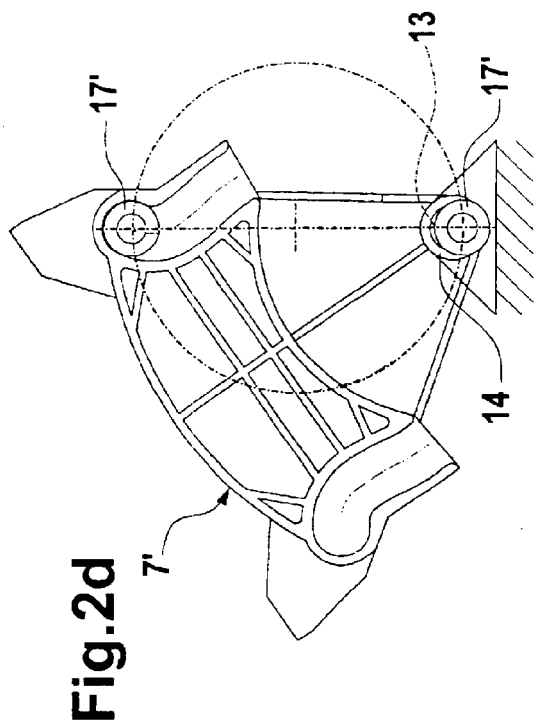

FIGS. 2a, 2b, 2c and 2d shows a side top views of a segment 7' of the support means 7, particularly to explain the free-running device, as well as two guide rollers 17', 17' of lever 16' (without showing the latter itself), in several operating positions; specifically, FIG. 2b shows the basic position, with tipping shell 4 shown with a dot-dash line, in which both the lever pivot angle α and support means tipping angle β (and thereby also tipping shell 4 rigidly screwed onto support means 7) is equal to 0 degrees.

Figure 3B:
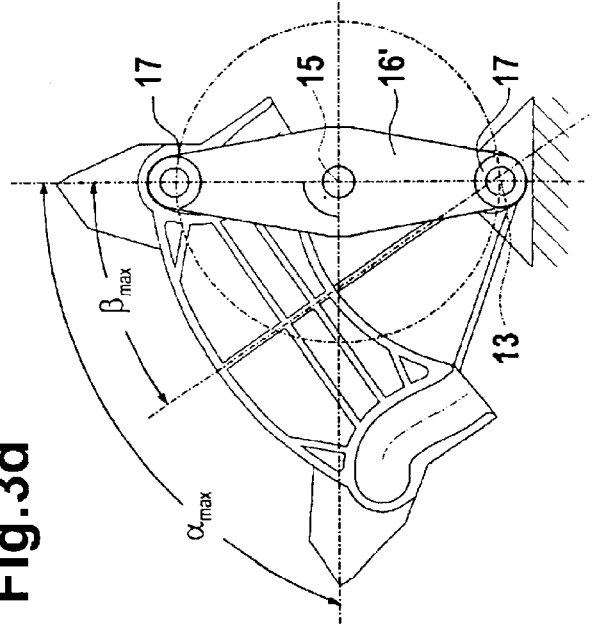

FIG. 2b shows the free-running region, in which guide rollers 17' move on arc-shaped first guide segment 18', about a second pivot axis 15 (see also FIG. 3), so that while support means tipping angle β continues to be 0°, lever pivot angle α is not equal to 0° (see also FIG. 3b). In this free-running region, electric motor 10 is brought up to its rated speed $n_0$, specifically in essentially load-free manner (except for its inherent losses), whereby FIGS. 2b and 3b already show the end position in the free-running region, in which the lever pivot angle α is 10 degrees.

Figure 2C:
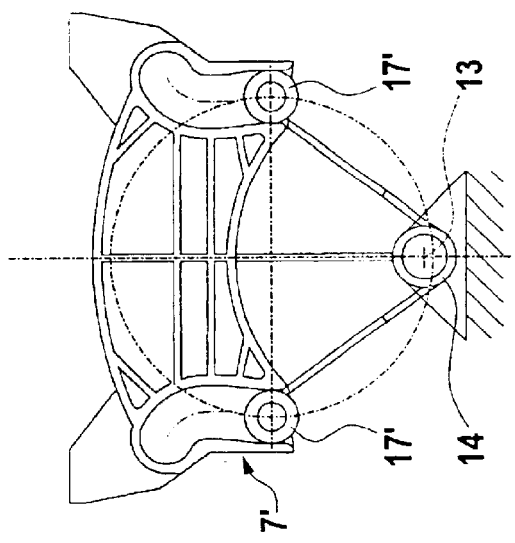
Figure 3C:
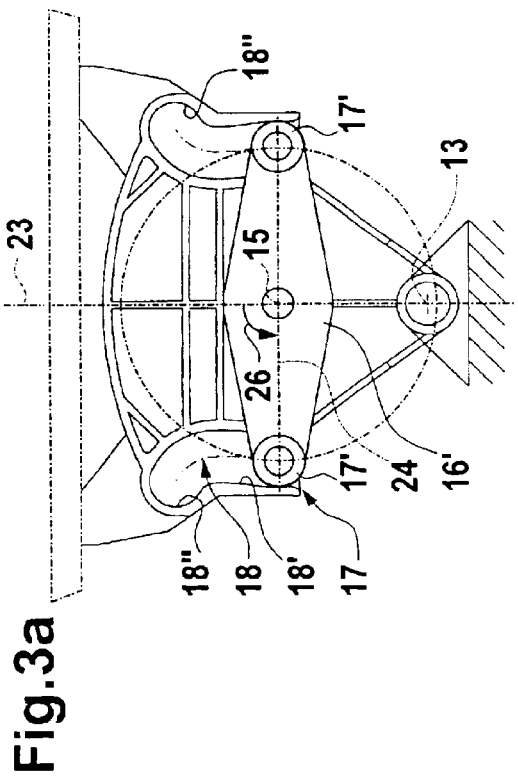

FIGS. 2c and 3c show an intermediate position in the tipping region, in which both the lever pivot angle α and the support means-tipping angle β are not equal to 0°, since lever 16' has already moved clearly beyond the free-running region limit of α=10°, and guide rollers 17' are already in the second guide segment 18" (which is only the case for one guide roller 17' with regard to the lever 16'). Meanwhile, the other guide roller 17' has already moved out of the left guide in FIG. 2c and FIG. 3c, respectively.

Figure 2D:
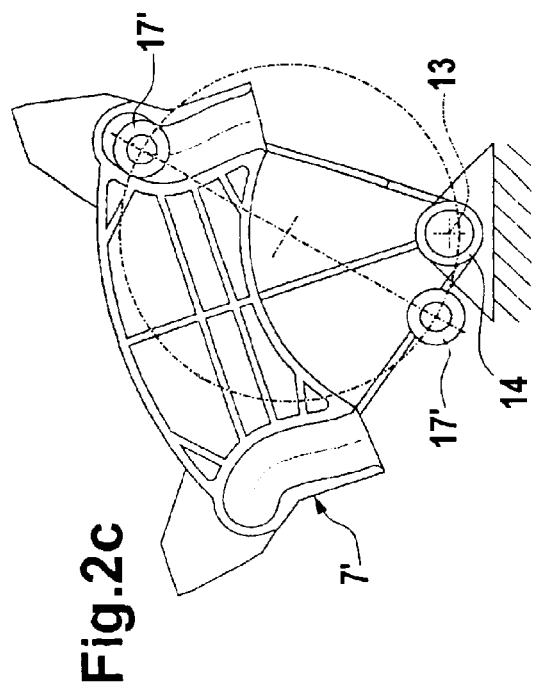
Figure 3D:
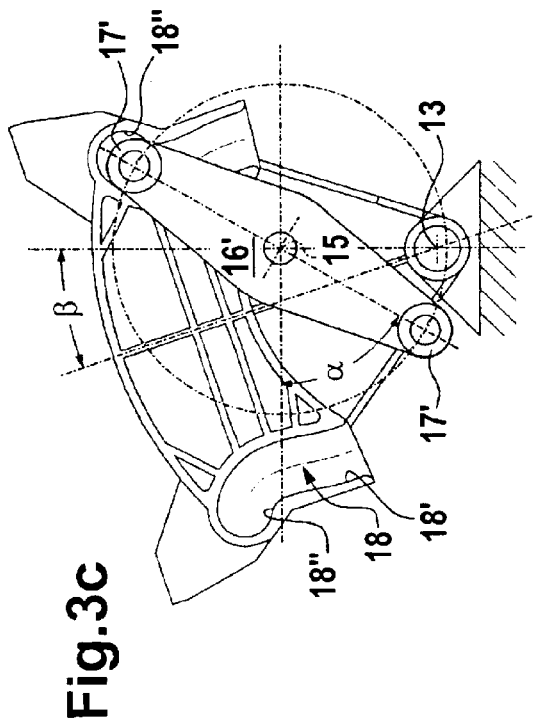

FIGS. 2d and 3d show the final tipping position, in which the lever pivot angle α is 90°, and the support means tipping angle β is 35°.

Figure 5:
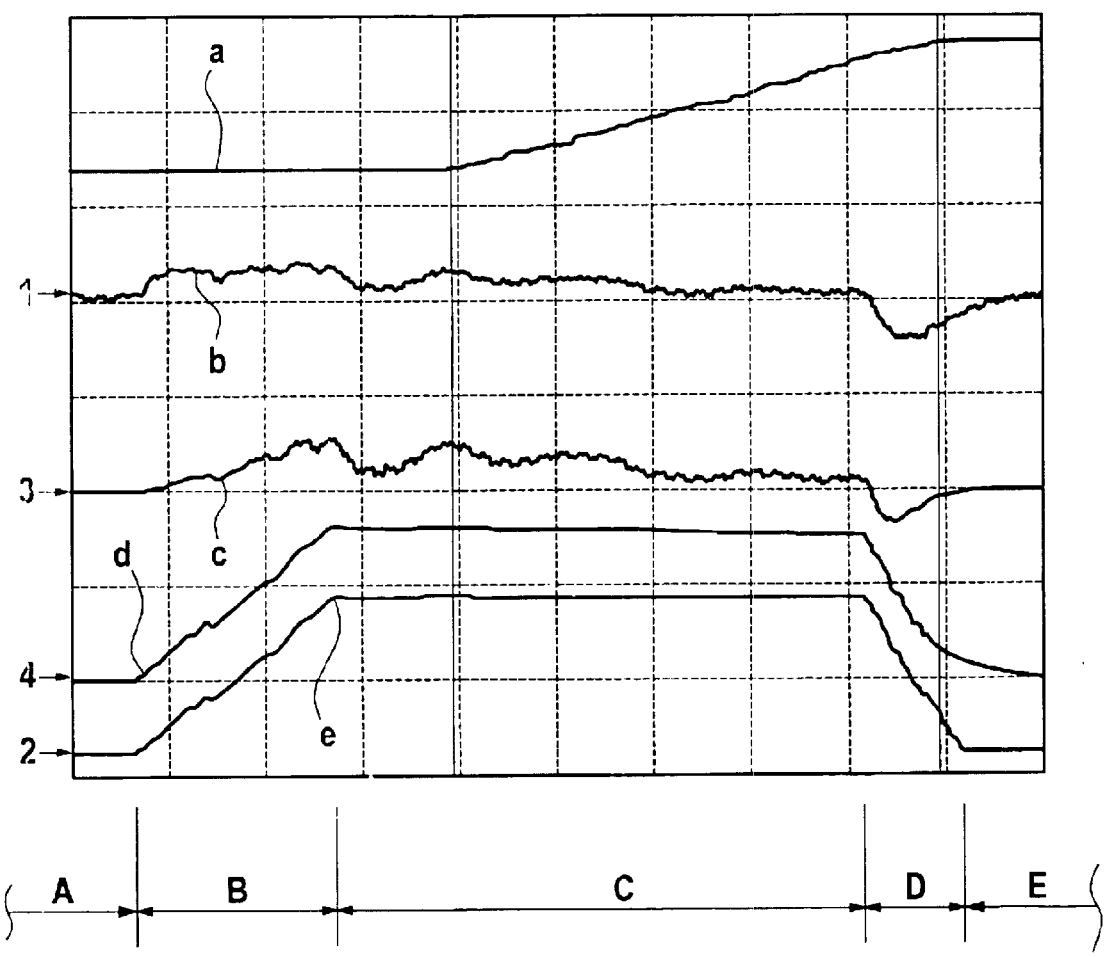
FIG. 5 is a chart showing various measurement curves, of the support means tipping angle, the current consumption of the electric motor corresponding to the motor torque, the power consumption of the electric motor, the motor voltage, as well as the ramp of the reference voltage of the motor with respect to time.

FIG. 5 shows, from top to bottom, a measured progression of the support means tipping angle β (Curve a), the current consumption $I_M$ of electric motor 10 corresponding to its torque (Curve b); the power consumption of electric motor 10 as a product of the current consumption values $I_M$ and the actual voltage $V_{Ist}$ corresponding to the output P; (Curve c); the motor voltage $V_{Ist}$ (Curve d), and the reference value ramp of motor 10 as the voltage $V_{Soll}$ (Curve e), plotted over a time axis.

The segment A of the abscissa corresponds to a conveyor drive in which a tipping conveyor element 3 loaded with a piece goods part carries out line travel, which functionally ends at the border point to region B. At this point, tipping conveyor element 3 receives a defined tipping signal from an external control device that is provided with, or connected to a computer, in timely manner, ahead of intended target location 2, causing the reference value ramp for electric motor 10 of electric tipping drive 9 of tipping conveyor element 3 to be triggered (Curve e). The motor voltage $V_{Ist}$ (Curve d) then increases in a linear manner, so that electric motor 10 starts to move. The entire electric tipping drive 9 then starts to move. In other words, electric motor drive 10 drives two levers 16', 16" of lever arrangement 16 (in FIG. 3a), according to arrow 26, in the counter-clockwise direction, by way of the worm wheel gear mechanism and the two radial gear wheel mechanisms 21, 21'. The two levers 16', 16" then start to turn in the counter-clockwise direction about second pivot axis 15, but in the free-running region, since guide rollers 17' arranged at their two ends, are initially located on first guide segment 18', which runs about second pivot axis 15' in an arc shape.

When levers 16', 16" have reached the lever pivot angle $β_{max}$ of 10°, electric motor 10 has, by then, been brought up to its rated speed $n_0$, without a load. Thus, the entire electric tipping drive 9 is in the rated operating state. Guide rollers 17' are then brought into second guide segment 18" of their guide track 18, which no longer runs about second pivot axis 15 in arc shape, but rather runs essentially out towards the outside from this circular track. Guide rollers 17' then exert a torque on disk-shaped segments 7', 7', that define support means 7 that is screwed together with tipping shell 4, as electric motor 10 continues to turn. Shell 4 is then pivoted out of its upright transport position, in the direction of the arrow 26, about tipping axis 13, until the support means tipping angle $β_{max}$ has reached a value of 35° in the final tipping position. The piece goods part supported by tipping conveyor element 3 is then delivered from sorter 1, towards the side. In this position, two levers 16' and 16" have each pivoted out of their normal position in the transport state, by $α_{max}$=90° in the counter-clockwise direction.

Subsequently, electric motor 10, which is preferably a direct current motor, is automatically reversed, by means of a pole reversal, so that tipping shell 4 is tilted back from its final tipping position to its upright transport position (see FIGS. 2a and 3a). It is then locked in place again not only in the transport position, but also in all the intermediate positions, by means of the self locking worm wheel gear mechanism 22. The corresponding work regions are indicated in FIG. 5 as Sectors C, D, and E, respectively, whereby E corresponds to work region A again, the pure transport operation.

Figure 6:
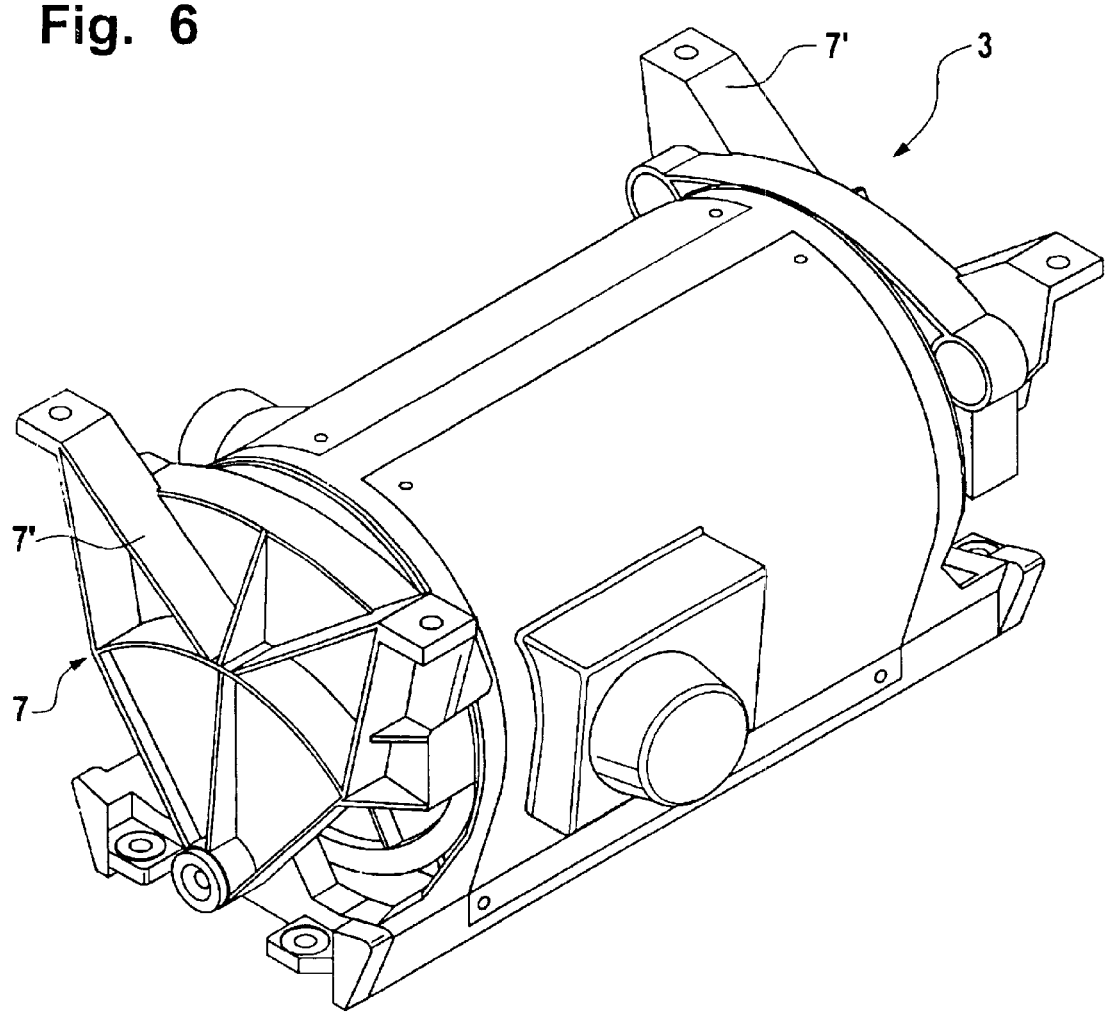
FIG. 6 is a perspective view of the electric motor tipping drive for a tipping conveyor element.
Figure 7:
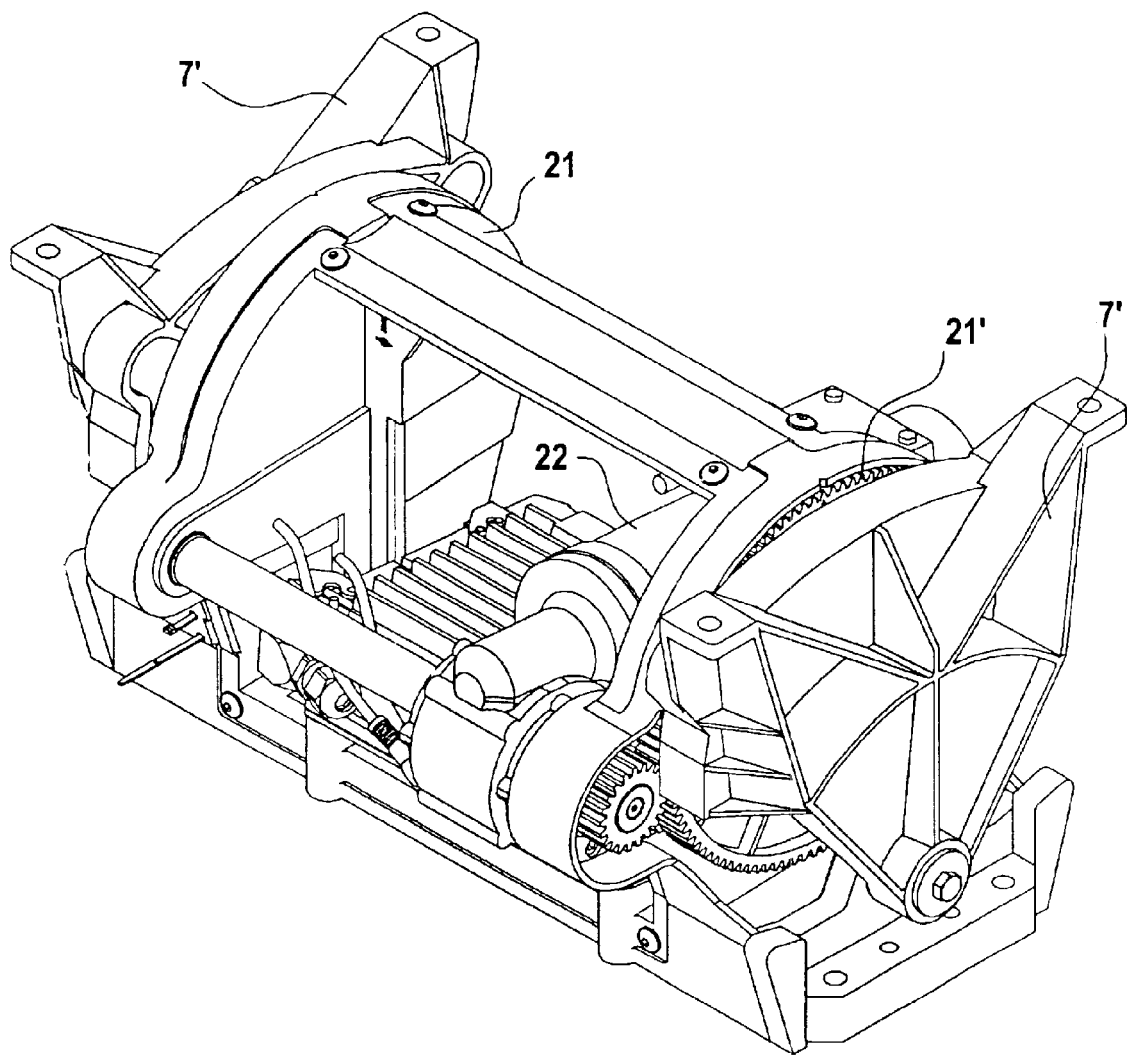
FIG. 7 is a perspective view according to FIG. 6, with the cover panel removed and with the support means in an upright transport position.
Figure 8:
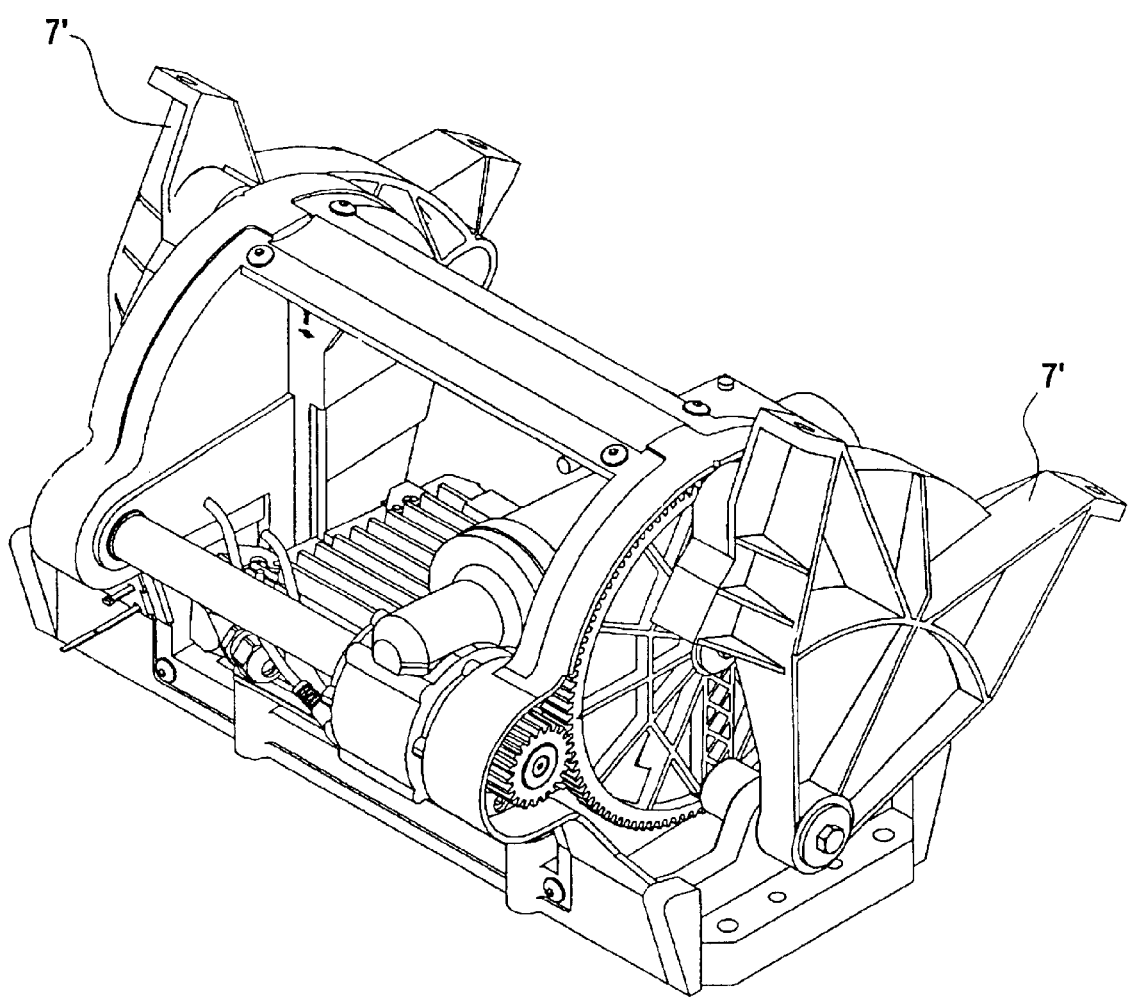
FIG. 8 is a perspective view corresponding to FIG. 7, in which the support means is in a tipping position; and, FIG. 9 is an exploded view of the components of the electric motor tipping drive in a reduced representation as compared with FIGS. 6–8.

FIGS. 6–8, show perspective views of a partial representation of a tipping conveyor element 3, with its two disk-shaped segments 7', 7', that form support means 7. FIG. 7 shows to the complete representation according to FIG. 6, without the housing, and shows the relation in which the gear mechanism of FIG. 4 stands with respect to two disk-shaped segments 7', 7' of support means 7, and how gear mechanism 21, 21', 22 is disposed in the system, when viewed together with FIG. 1, and how this essential part of tipping conveyor element 3 is located relative to rail guide 5. FIG. 7 shows the system in the transport state, with upright segments 7', 7', and FIG. 8 shows a corresponding representation in the final tipping position at a tipping angle $\beta=35°$.

Figure 9:
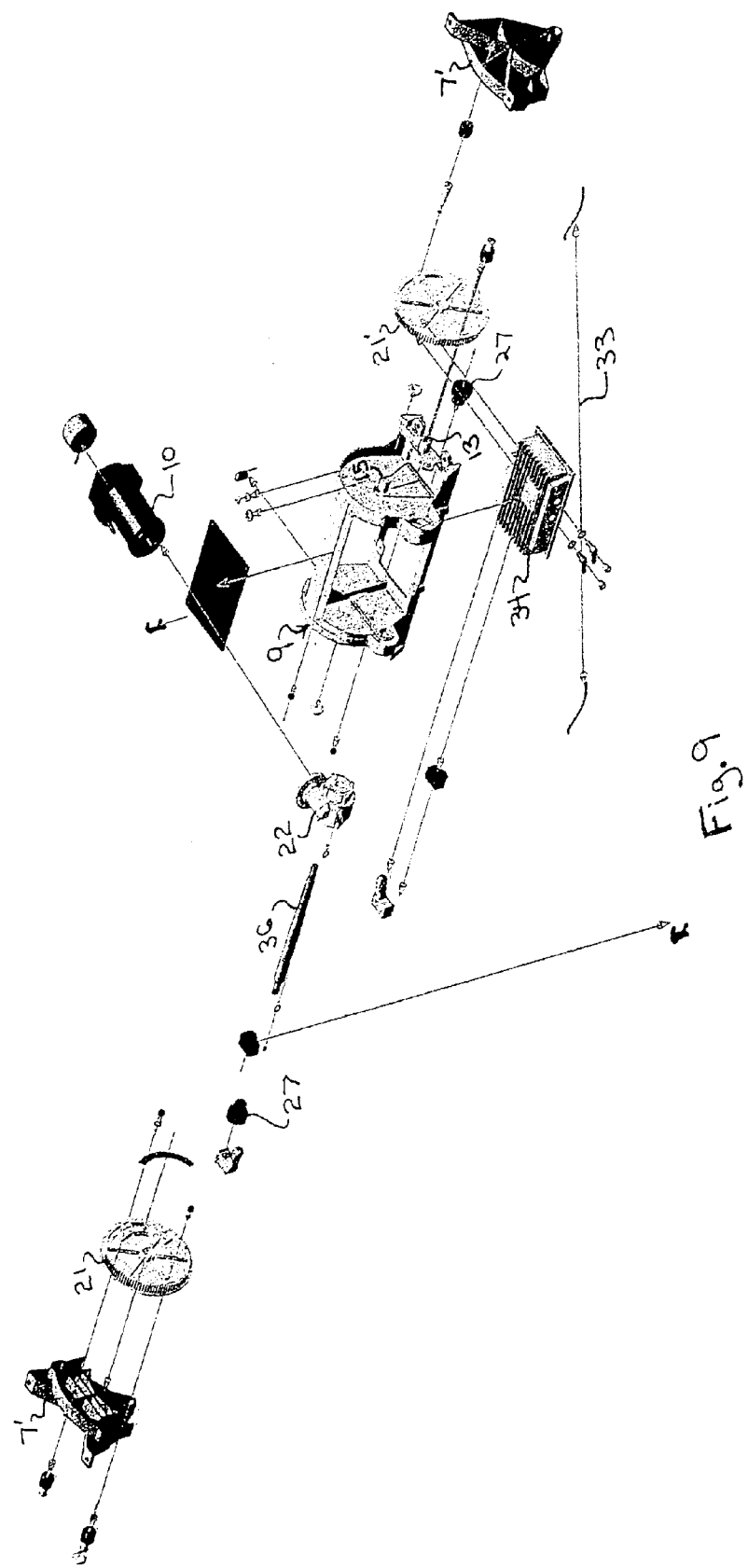

FIG. 9 shows an exploded view of the system of FIGS. 6–8, but reduced in size.

With the present invention, a tipping conveyor element of the general type is provided, which permits a tipping operation by means of electrical energy transmitted in a contact-free manner, providing a great improvement in the art. The device allows for a sufficiently rapid tipping after a tipping signal is received, before a predetermined target location has been reached. The system provides an optimal utilization of the available maximum electrical energy supply, because of "resistance splitting with time delay," whereby the tipping shell sorter guarantees an exact positioning of the tipping conveyor shell in the upright transport position, because of the free-running operation even in the upright transport position, completely independent of the position of the drive. The requirements concerning motor control, with regard to the accuracy of the shell positioning by the motor, can be significantly reduced, or eliminated, to a great extent. Moreover, there is a reliable locking in place present in the upright transport position, and reliably guaranteed even in case of a power failure, or a failure of the drive elements: The tipping conveyor shells nevertheless remain fixed in place, which is a significant advantage for accident prevention, and for a gentle handling of the piece goods parts. Furthermore, the construction height is significantly reduced, particularly because the power point of rotation or tipping axis of the tipping shell. Because of the worm wheel gear mechanism, self-locking is always guaranteed even in the inclined intermediate positions of the support means, and therefore for the tipping shell connected with it in rigid manner. Thus, a sorter equipped with the inventive tipping conveyor elements has many significant advantages as compared with the state of the art units. Moreover, many new application cases can be opened up, for which conventional sorters are not suitable. The investment expenditure required by the electric drives is more than made up by all of these advantages, so that a tipping shell sorter formed from tipping conveyor elements according to the invention, is highly advantageous also when considering economic aspects.

It is furthermore advantageous that the tipping conveyor element experience low wear and little noise, because of the contact-free transmission of energy. Also, the tipping time, the moment of tipping, and the tipping angle can be easily set and, if necessary, changed, by means of software parameter settings. The tipping shells can then be returned to their upright position immediately after delivery of a piece goods part, and are then available once again. The conveyor shells can be inclined in simple manner, in horizontal curves of the conveyor path, by means of appropriate control, in order to prevent unintentional ejection of the piece goods by compensating for any resulting centrifugal forces.

Figure 10:
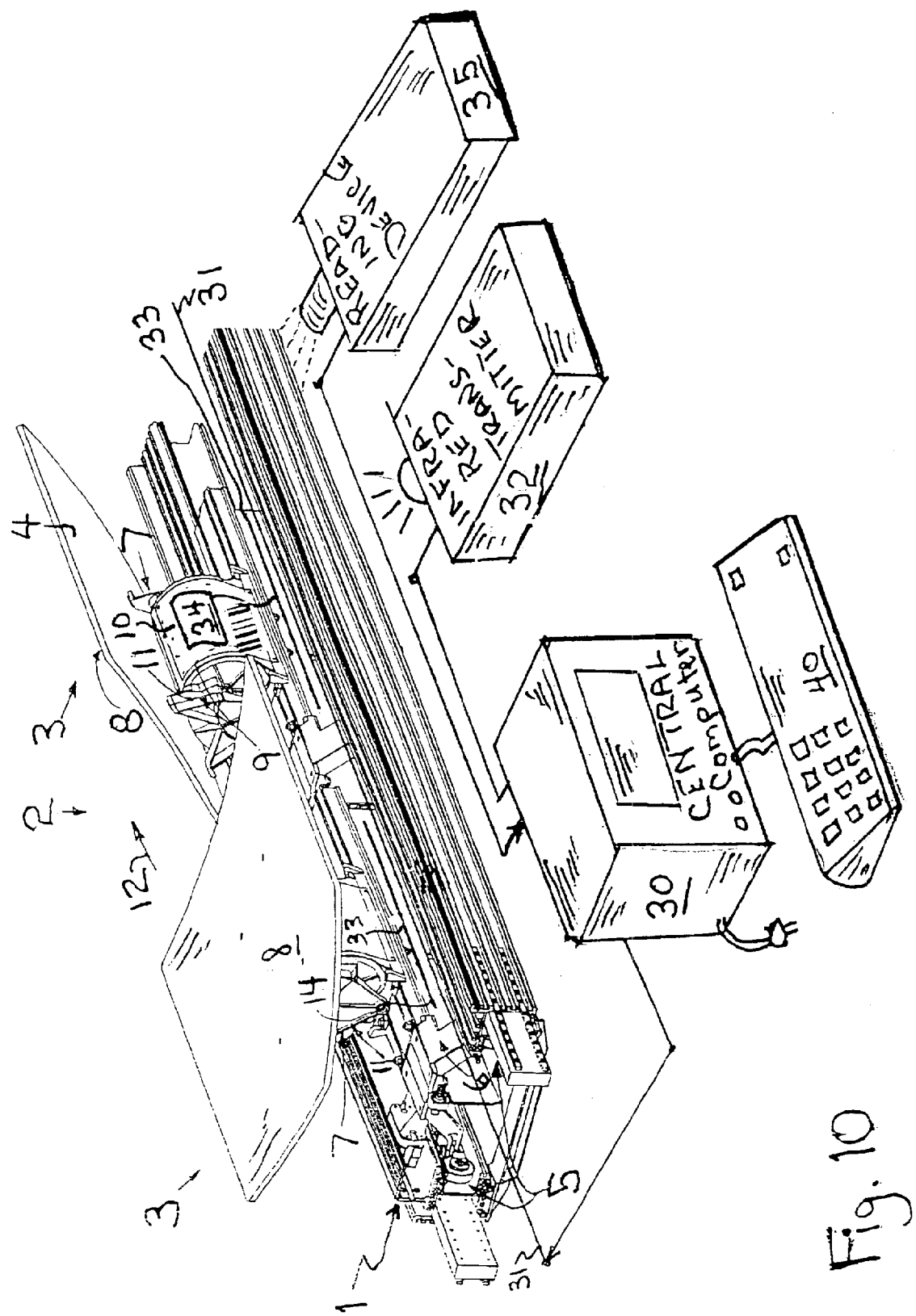
FIG. 10 is a perspective view showing the interconnection of the computer and its components to the conveyor system of the invention.

Referring to FIG. 10, the individual tilting conveyor elements 3 of sorter 1 are each individualized or coded by means of a mark that can be identified by a reading device 35 that is arranged on the conveyor line. Reading device 35 inputs the relevant information to a central computer 30 that controls the gating in and gating out of the pieces of piece goods. The conveying speed, among other things, is input into central computer 30 as well, so that the instantaneous location of each tilting conveyor element 3 can be computed.

Since the speed of the conveyor can be held constant, central computer 30 can calculate when a particular conveyor element 3 is about to reach a selected unloading station and therefore, trigger transmitter 32 nearest the station to initiate an activation signal. On the other hand, since each station is coded with a mark, a reading device 35 on the conveyor line nearest the selected unloading station can detect a preselected conveyor element 3, and its selected piece goods.

When a piece of piece goods is loaded onto a defined tilting conveyor element 3 at a loading station, central computer 30 receives and records that information. A piece of the piece goods that has been loaded on sorter 1 has to be later unloaded at a defined unloading site or targeted location 2. The pieces of piece goods are provided with a relevant coding such as a bar code, that is transmitted to central computer 30 when the pieces are loaded, so that central computer 30 can trigger or issue a control signal at the given time that will finally cause the tilting process to take place at the intended target location or station. Central computer 30 can also be provided, in some other way, such as through the use of its keyboard 40, with the information that a piece of the piece goods that has been loaded on a defined tilting conveyor element 3, has to be unloaded at a defined location or discharge station. This may be the case, for example when a number of identical pieces of piece goods have to be distributed to several discharge locations.

For the contact-free transmittal of the electrical driving energy to electric motors 9 of tipping devices 11, a stationary conductor 31 is fed with high-frequency electrical energy, either by computer 30 or by a separate power supply and stationary conductor 31 is installed along the conveying line or rail guide 5. Moreover, a pick-up element 33 is provided on each sorter 1 that is capable of inductively picking up the electrical energy and control signals radiated by stationary conductor 31, and transforming that energy into a form of energy required for operating electric motor 10 after tilting conveyor element 3 has received a signal from central computer 30.

A transmitter 32 is also located at a defined distance upstream from each discharging point or station that is connected with central computer 30. Transmitter 32 is capable of transmitting in a contact-less manner, an activation signal to a tipping conveyor element 3 that is passing by it. Transmitter 32 may be, for example an infrared transmitter.

Each tipping conveyor element 3 is provided with a control device 34 that comprises a receiver for detecting the activation signal. Once control device 34 has been activated upon receiving such a signal, pick-up element 33 of tipping conveyor element 3 will receive electrical energy from its contract free conductor 31 and supply electric motor 10 of the tipping device 3 with driving energy. Electric motor 10 will then initially run up to its nominal rotational speed in the idle run. Motor 10 with its inertial speed, will then perform the tilting movement in order to unload the piece of piece goods conveyed by tipping conveyor element 3 to the intended unloading location, as the conveyor element passes by that selected station.

Accordingly, while a few embodiments of the present invention have been shown and described, it is to be understood that many changes and modifications may be made thereunto without departing from the spirit and scope of the invention as defined in the appended claims.

What is claimed is:

1. A method for the optional individual or group activation of tipping conveyor elements (3) for a tipping shell sorter (1) traveling on a conveyor system which are each provided with an electric motor tipping drive (9) comprising the steps of;
- supplying the electric motor (10) of the electric motor tipping drive (9), with electrical energy transmitted in a contact-free manner,
- bringing the electric motor to its idle rated speed ($n_0$), essentially without a load; and,
- initiating the tipping process, when the electric motor is essentially in an idle or free-running operation.

2. The method according to claim 1, wherein during said step of initiating the tipping process, the tipping movement of each tipping conveyor element (3) is controlled, so that the maximum electrical output available to electric motor (10) is not exceeded at any time by the power demand during the tipping process.

3. The method according to claim 2, wherein the tipping movement is controlled so that the electric motor (10), which has previously been brought at least essentially to its rated speed ($n_0$) in idle, will produce an output, during and after said step of initiating the tipping process, by means of a corresponding acceleration of the tipping shell (4) and the piece goods load, that is essentially equal to the maximum power supply.

4. The method according to claim 3, wherein after the step of initiating the tipping process, said tipping conveyor element (3) to be tipped is essentially permanently accelerated, until it has reached its final tipping position.

5. The method according to claim 4, wherein said tipping conveyor element (3) to be tipped is braked just before it reaches its final tipping position.

6. The method according to claim 5, wherein said tipping conveyor element (3) to be tipped is electromechanically braked in the final tipping phase.

7. The method according to claim 4, wherein said tipping element (3) to be tipped is essentially accelerated constantly, until it has reached its final tipping position, after said step of initiating the tipping process.

8. A tipping conveyor system for a tipping shell sorter (1), for driven movement along a generally closed loop conveyor guide (5), in a transport direction (12), for targeted, individual delivery of piece goods parts that were previously taken up on at least one take-up station, for subsequent delivery to one of a plurality of target locations (2), in response to a tripping control signal, comprising;
- a plurality of tipping conveyor elements (3) connected in tandem with one another in an articulated manner, for movement along the conveyor guide (5), each tipping conveyor element (3) comprising
- a non-tippable bottom part (6), slidably disposed on the conveyor guide (5) for movement along the transport direction;
- a support means (7) disposed on said bottom part (6) and having a tipping device (11) pivotable about a tipping axis (13) that runs in the transport direction (12) of said tipping conveyor element (3) and including
- a support surface (8) mounted on said tipping device (11), in the form of a tipping shell (4) and which in its upright transport horizontal position, supports piece goods parts;
- an electric tipping device (9), having an electric motor (10), and coupled to said tipping device (11);
- a control device (34) connected to said electric tipping device (9) so that after receiving a tipping control signal, said electric motor (10) is first brought essentially to its rated idle speed ($n_o$), without initially activating said tipping device (11), and said tipping device (11) is then automatically activated by said control device (34), as soon as said electric motor (10) has reached its rated speed ($n_o$), so that said tipping device (11) and its support surface (8) pivots about said tipping axis (13) into a slanted delivery position toward the target station for delivering of the price good parts contained thereon to the target station.

9. The tipping conveyor system according to claim 8, wherein the maximum electrical output available to said electric motor (10) is not exceeded by the power demand of the system any time during the tipping process.

10. The tipping conveyor system according to claim 9, wherein the tipping movement of said tipping drive (9) is controlled, so that after said electric motor (10), is initially brought to its rated speed ($n_0$), said control device (34) produces an output, during and after initiation of the tipping process by means of corresponding acceleration of said tipping shell device (11) and its piece goods load, that is essentially equal to the maximum power supply.

11. The tipping conveyor system according to claim 10, wherein said tipping device (11) and its support surface (8) are accelerated, after initiation of the tipping process, until they have reached their final tipping position.

12. The tipping conveyor system according to claim 11, wherein said support means (7) includes a braking device, so that said support means (7) with said tipping shell (4) attached to it, as well as the piece goods load disposed on said shell (4), is braked just before reaching the final tipping position.

13. The tipping conveyor system according to claim 11, wherein after initiation of the tipping process, said tipping shell (4) is constantly accelerated after having received a tipping control signal, until reaching its final tipping position.

14. The tipping conveyor system according to claim 8, wherein said tipping device (11), and said control device (34) coupled to it, has a free-running device which, after said tipping conveyor element (3) has received a tipping signal, when said electric motor (10) is being brought up to its rated speed ($n_0$), causes said support means (7) to remain in its upright position, and that said tipping and/or control device are designed so that said support means (7) is automatically tipped out of its upright transport position into its slanted tipping position, when said electric motor (10) has reached its rated speed ($n_0$).

15. The tipping conveyor system, according to claim 14, wherein said support means (7) has an articulated bearing (14) that is mounted to pivot said support means (7), in limited manner, on its tipping axis (13);
- a locking means coupled to said support means (7), wherein said support means (7) can be releasably mechanically locked in its transport position,
- a lever arrangement (16) for pivoting, in limited manner, about a second pivot axis (15), disposed parallel to said tipping axis (13), on said support means (7), said lever arrangement (16) having a guide means (17) that is guided in a guide (18) formed in said support means (7) and provided below said support surface (8);
- a gear mechanism (19) for connecting said electric motor (10) with said lever arrangement (16) whereby said guide (18) is structured, in a first guide segment (18'), in an arc shape about said second pivot axis (15), so that a rotation of the power take-off axis of said electric motor (10), and therefore of said lever arrangement (16), during the circular movement of said guide means (17) on said arc-shaped first guide segment (18'), about said second pivot axis (15), does not at first result in any tipping movement of said support means (7) and of the piece goods part supported by it about said second pivot axis (15) or the tipping axis (13);

a second guide segment (18") that contiguous with and immediately following said first guide segment (18'), and disposed in said support means (7), said second segment (18") not running in arc shape relative to said second pivot axis (15), but in such a manner that if said electric motor (10), which has been brought up to its rated speed ($n_0$), is rotated further, a torque is exerted on said support means (7) by said lever arrangement (16), which initiates and carries out tipping of said support means (7) about said tipping axis (13).

16. The tipping conveyor system according to claim 15, wherein said lever arrangement (16) comprises two levers (16', 16") that are disposed at a reciprocal lengthwise distance from one another.

17. The tipping conveyor system according to claim 16, wherein said levers (16', 16") are structured essentially in a disk shape.

18. The tipping conveyor system according to claim 16, wherein said levers (16', 16") are provided with gear teeth on one surface, which engage with a radial gear wheel (21, 21'), whereby said radial gear wheels (21, 21') form said gear mechanism (19), forming a part of the gear mechanism of said electric tipping drive (9).

19. The tipping conveyor system according to claim 18, wherein said radial gear mechanism (21, 21') has a self-locking device, designed as a worm gear mechanism (22), coupled to said electric motor (10).

20. The tipping conveyor system according to claim 15, wherein said guide means (17) is formed by guide rollers (17') that are each arranged on an end segment of said lever (16' or 16").

21. The tipping conveyor system according to claim 20, wherein each lever (16', 16") is provided with a guide roller (17') at its two end segments.

22. The tipping conveyor system according to claim 8, wherein said support means (7), which is screwed to said tipping shell (4) to form said support surface (8) at its top, consists of two essentially disk-shaped segments (7') spaced apart horizontally from one another, and arranged to pivot on said tipping axis (13) so that their longitudinal center axis (23) runs essentially vertically in the upright transport position of said tipping conveyor element (3).

23. The tipping conveyor system according to claim 22, wherein said spaced apart disk-shaped segments (7') of said support means (7) are structured essentially with mirror symmetry, whereby their longitudinal center axis (23) lies in the plane of symmetry.

24. The tipping conveyor system according to claim 15, wherein said second pivot axis (15) is disposed above said tipping axis (13).

25. The tipping conveyor system according to claim 24, wherein said second pivot axis (15) is arranged perpendicular above said tipping axis (13) with respect to the horizontal plane.

26. The tipping conveyor system according to claim 16, wherein said levers (16' and 16") are structured essentially with mirror symmetry, relative to a center axis that runs through their pivot axis (15).

27. The tipping conveyor system according to claim 16, wherein said two levers (16', 16") are arranged so that their longitudinal axis, which runs through their two guide means (17, 17'), runs essentially horizontal in the transport direction (12) of said tipping conveyor element (3).

28. The tipping conveyor system according to claim 20, comprising guides (18) that guide said guide rollers (17') and are each formed as recesses in said segments (7', 7') that form said support means (7), and include guide surfaces (25) formed in said segments (7'7'), which essentially run parallel to the surfaces of said segments (7'), and define running tracks for receiving said guide rollers (17', 17').

29. The tipping conveyor system according to claim 8, wherein during the tipping of said support means, said two levers (16', 16") have a lever pivot angle ($\alpha$) that is approximately 90°, when said support means (7) has a tipping angle ($\beta$) of approximately 35°.

30. The tipping conveyor system according to claim 8, wherein in the free-running operation with a support means tipping angle $\beta=0°$), said lever pivot angle ($\alpha$) is approximately 10°.

31. A tipping conveyor system as recited in claim 8 comprising;

a stationary conductor (31) disposed along the conveyor guide (5) in the transport direction (12);

a pick up element (33) disposed on each of said conveyor elements (3) adjacent to said stationary conductor for receiving electromagnetic energy and control signals from said stationary conductor, said pick up element (33) being connected to said control device (34) for providing electrical power to said electric tipping device (9) and said motor(10).

32. A tipping conveyor system as recited in claim 31 additionally comprising a central computer coupled to said stationary conductor (31) for providing control and tipping signals to said control device (34).

33. A tipping conveyor system as recited in claim 32 further comprising a transmitter disposed adjacent to said target location and coupled to said computer for sending a tipping signal to said control device.

34. A tipping conveyor system as recited in claim 32, wherein each of said conveyer elements is individually coded, and comprising a reading device (35) directed at one of said conveyor elements (3) and connected to said computer (30) for reading the code on said conveyer element (3) as it approaches a target station.

35. A tipping conveyor system for a tipping shell sorter (1), for driven movement along a generally closed loop conveyor guide (5), in a transport direction (12), for targeted, individual delivery of piece goods parts that were previously taken up on at least one take-up station, for subsequent delivery to one of a plurality of target locations (2), in response to a tripping control signal, comprising;

a plurality of tipping conveyor elements (3) connected in tandem with one another in an articulated manner, for movement along the conveyor guide (5), each tipping conveyor element (3) comprising a pivotable tipping element, pivotable about a tipping axis (13) that runs in the transport direction (12) disposed in each conveyor element (3)

and having a support surface (8) in the form of a tipping shell (4) and which in its upright transport horizontal position, supports piece goods parts;

an electric tipping drive coupled to said tipping element;

a programmable computer (30) for selectively determining the target stations for each of said conveyor elements (3) and providing tipping control signals;

a control device (34) connected to said electric tipping drive and responsive to said programmable computer

(30) so that after receiving a tipping control signal, said electric tipping drive of an individual conveyor element (3) is first brought to its rated idle speed ($n_o$), without initially activating said tipping element, and said tipping element is then automatically activated by said control device (34), as soon as said electric tipping drive has reached its rated speed ($n_o$), so that said tipping drive and its support surface (8) pivots about said tipping axis (13) into a slanted delivery position toward the target station for delivering of the price good parts contained thereon to the target station during the movement of said conveyor system.

* * * * *